E. P. DAVIES.
NUT LOCK.
APPLICATION FILED APR. 22, 1911.

1,007,772.

Patented Nov. 7, 1911.

Witnesses

Eben P. Davies,
Inventor
by C. A. Snow & Co.
Attorneys

COLUMBIA PLANOGRAPH CO., WASHINGTON, D. C.

UNITED STATES PATENT OFFICE.

EBEN P. DAVIES, OF SCRANTON, PENNSYLVANIA.

NUT-LOCK.

1,007,772. Specification of Letters Patent. Patented Nov. 7, 1911.

Application filed April 22, 1911. Serial No. 622,715.

*To all whom it may concern:*

Be it known that I, EBEN P. DAVIES, a citizen of the United States, residing at Scranton, in the county of Lackawanna and State of Pennsylvania, have invented a new and useful Nut-Lock, of which the following is a specification.

It is the object of the present invention to provide an improved nut lock, simple in construction, inexpensive to manufacture, and capable of ready use, the primary aim of the invention being to provide a nut lock in the form of a small bowed key which may be quickly and readily applied to any ordinary bolt and nut and will, when in place, effectually lock the nut against backward rotation upon the bolt.

Figure 1:
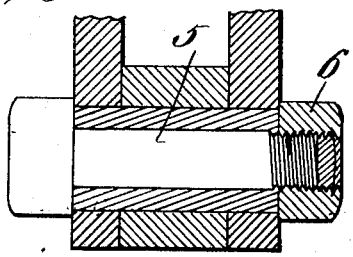
Figure 2:
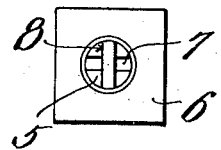
Figure 3:
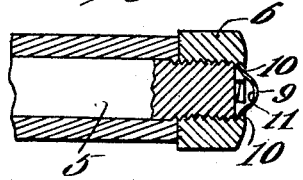
Figure 4:
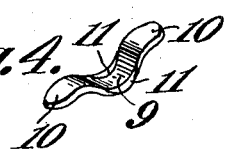
Figure 5:
Figure 6:
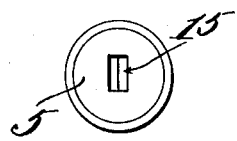
Figure 7:
Figure 8:

In the accompanying drawing—Figure 1 is a longitudinal sectional view through a bolt and nut connected in locked relation by means of the locking key embodying the present invention. Fig. 2 is an end view of the bolt and the nut thereon. Fig. 3 is a view similar to Fig. 1 illustrating the manner of initially applying the key to the nut and bolt. Fig. 4 is a perspective view of the key. Fig. 5 is an end view of the bolt. Fig. 6 is an end view of a slightly modified form of bolt. Fig. 7 is a perspective view of a slightly modified form of locking key. Fig. 8 is a perspective view illustrating still another form of the locking key.

In the drawings, there is shown a bolt 5 upon which is threaded a nut 6. The bolt and the nut are both of the ordinary construction except that the bolt is formed in its threaded end with a seat which may be either in the form of a groove, or in the form of a recess, depending upon the form of locking key to be used in connection therewith. In the form of the invention shown in Figs. 1 to 5 inclusive, the bolt is formed in its end with intersecting grooves which, for the sake of convenience, will be indicated, one by the numeral 7 and the other by the numeral 8, these grooves extending at right angles to each other as clearly shown in Fig. 5 of the drawing. The locking key in this form of the invention is illustrated as including an intermediate bowed portion 9 and terminal portions 10. The concave face of the bowed intermediate portion of the key is beveled at its lateral edges as at 11 and as clearly shown in Fig. 4 of the drawing. In assembling the locking key shown in Fig. 4 with the bolt and nut for the purpose of locking the nut against rotation upon the bolt, the key is placed in the bolt opening in the nut in about the position shown in Fig. 3 of the drawing. It is then struck a sharp blow with a hammer or other tool whereupon it will be flattened out and forced into the grooves 7 or 8, it being shown in the instance of the present invention (see Fig. 2) as seating in the groove 8. The terminal portions 10 of the key will at such time of course be tightly wedged against the wall of the bolt opening in the nut and as a consequence the nut will be held not only against backward rotation but also against further movement in a direction to tighten it upon the bolt. Should it be desired to release the nut so that it may be removed from the bolt, a sharp pointed tool may be inserted in the groove 7 and beneath either one of the beveled edges of the key and the key pried out of its seat in the groove 8, by this tool. Of course, if the key is seating in the groove 7, then the tool is to be inserted into the groove 8 it being understood that these two grooves are identical and have only been designated by different reference numerals as a matter of convenience when referring to them.

In Fig. 4 of the drawing, the key is illustrated as having blunt terminal portions 10 which are to be merely wedged against the wall of the bolt opening in the nut. However, this key may assume the form shown in Fig. 8 of the drawings in which latter instance its terminal portions 10 are sharply pointed as indicated by the numeral 12, it being understood that in this latter form of key the terminal portions are to be hardened and are intended to bite into the wall of the nut when the key is flattened out.

In the form of the invention shown in Figs. 6 and 7 of the drawing, the bolt is formed in its end with a recess 15 having anticlinal walls and the key, shown in Fig. 7 and indicated by the numeral 16, is formed upon its concave side with a wedge-like lug 17 adapted to seat in the recess 15 when the key is flattened out. The recess 15 may readily be formed in a common bolt, upon occasion, by the use of a cold chisel or like tool.

What is claimed is:

1. The combination with a bolt and a nut threaded thereon, the bolt being formed with a seat in its end, of a lock for the nut comprising an initially bowed key disposed in the bolt opening of the nut and flattened to position a portion thereof in the said seat in the end of the bolt and to bind its ends against the wall of the said bolt opening of the nut.

2. The combination with a bolt and a nut threaded thereon, the bolt being formed in its ends with a groove, of a lock for the nut comprising an initially bowed key disposed in the bolt opening in the nut and flattened to position its intermediate portion in the groove in the end of the bolt and to bind its ends against the wall of the said bolt opening.

3. The combination with a bolt and a nut threaded thereon, the bolt being formed in its ends with intersecting grooves, of a lock for the nut comprising an initially bowed key disposed in the bolt opening in the nut and flattened to position its intermediate portion in one of the grooves in the end of the bolt and to bind its ends against the wall of the said bolt opening.

4. The combination with a bolt and a nut threaded thereon, the bolt being formed in its ends with intersecting grooves, of a lock for the nut comprising an initially bowed key disposed in the bolt opening in the nut and flattened to position its intermediate portion in one of the grooves in the end of the bolt and to bind its ends against the wall of the said bolt opening, the said key having its lateral edges beveled, upon its under side.

In testimony that I claim the foregoing as my own, I have hereto affixed my signature in the presence of two witnesses.

EBEN P. DAVIES.

Witnesses:
E. H. DAVIES,
EVAN A. DAVIES.

---

Copies of this patent may be obtained for five cents each, by addressing the "Commissioner of Patents, Washington, D. C."